Patented Jan. 23, 1923.

1,443,149

UNITED STATES PATENT OFFICE.

PHILIP SCHIDROWITZ, OF LONDON, ENGLAND.

RUBBER COMPOSITION AND METHOD OF MAKING THE SAME.

No Drawing.    Application filed February 2, 1922.    Serial No. 533,669.

*To all whom it may concern:*

Be it known that I, PHILIP SCHIDROWITZ, Ph. D., F. C. S., a subject of the King of England, residing in London, England, have invented certain new and useful Improvements in Rubber Composition and the Method of Making the Same, of which the following is a specification.

The present invention is for improvements in and relating to the manufacture of rubber.

The processes hitherto proposed for the production of vulcanized rubber from latex involve a series of operations. In the usual process, the rubber is vulcanized after coagulation and in a dried form. The latex has first to be coagulated, and the coagulum to be separated from the liquor and then washed, dried and masticated. The only alternative to this procedure, so far as I am aware, is a process in which rubber previously coagulated, dried and masticated, is dissolved in a suitable solvent, such as naphtha, benzene or the like, and is then vulcanized by heating the solution in presence of sulphur. This process possesses the advantage of providing a vulcanized rubber solution which could not otherwise be obtained from vulcanized rubber by reason of the relative insolubility of the latter in ordinary solvents. On the other hand, the process involves a number of disadvantages. A series of operations is necessary before the rubber is brought into solution, and apart from the difficulty and expense of effecting the dissolution of the raw rubber, comparatively costly solvents are required. Moreover, the solutions obtainable are relatively dilute although of a highly viscous nature. By the process of the present invention these various stages of treatment are eliminated, and a novel composition is obtained which is readily and advantageously adaptable to a variety of commercial applications.

I have discovered that uncoagulated or substantially uncoagulated caoutchouc-containing materials may be vulcanized without prior coagulation of the caoutchouc. For example, I have found that rubber latex may be vulcanized while in the substantially uncoagulated state so as to obtain an aqueous fluid preparation of vulcanized rubber which possesses several advantages, especially for certain uses as will hereinafter be made apparent. To preclude coagulation during the vulcanization the latex or other caoutchouc-containing material may be rendered definitely alkaline or definitely basic prior to treatment, although it appears feasible to vulcanize latex, for the purpose aforesaid, especially if it be fresh, without rendering it alkaline by artificial means. For safety, a definitely alkaline or basic state is preferred. I have further found that while some latices may be worked at full strength, in the case of others a greater or lesser degree of dilution with water may be necessary. Dilution may itself be employed as one means towards preventing coagulation during the vulcanization process.

By "definitely alkaline" or "definitely basic" is meant an alkaline reaction of the liquor to a suitable indicator, which, of course, will be chosen according to the reagents added to the mixing.

According to the present invention, therefore, the process for the manufacture of a vulcanized caoutchouc-composition comprises submitting an uncoagulated or substantially uncoagulated caoutchouc-containing material, such, for example, as rubber latex, to vulcanization under such conditions as to preclude any substantial coagulation of the caoutchouc-component during the vulcanization.

A preservative agent, for example, an alkali such as ammonia, may, as already indicated, be added to the latex or the like to inhibit coagulation, and, if desired, the alkali may be added in conjunction with the vulcanizing agent, for instance, in the form of an alkaline polysulphide.

Compounding materials such as fillers, pigments, dyes or the like, may be added at any suitable stage of the process, and the latex or the like may be diluted with water subsequent to vulcanization.

The vulcanization may be effected in any desired manner. For example, the latex may be admixed with the vulcanizing agent, with or without the addition of an accelerator, and the mixture then submitted to a suitable vulcanizing temperature and pressure for an appropriate time dependent upon the quantity of sulphur, or sulphur and accelerator, and the particular temperature employed. It will be appreciated, however, that the invention is not restricted to any particular method of vulcanization, and that various modifications may be made in the practical operation of the process, as well as in the application of the product, without departing from the scope of the invention, once it has been recognized that the latter is based upon the establishment of the fact that it is possible to vulcanize rubber latex directly without preliminary separation of the rubber.

It has been found that substantially no, or but very slight, coagulation occurs on vulcanization of the latex, the bulk of the rubber remaining in solution or colloidal suspension in a vulcanized form, as has been proved by chemical and physical tests. This vulcanized fluid may be separated from any undissolved matter, and is then ready for use. Such fluid vulcanized latex will keep for a considerable time.

The rubber may be separated from the vulcanized latex by evaporation of the liquid, or by the addition thereto of a coagulant, for example, an acid, such as acetic or sulphuric acid. The coagulum thus obtained consists of vulcanized rubber, and may be washed, milled sheeted or otherwise treated in order to obtain it in relatively pure form and of any convenient shape, in exactly the same way as any ordinary rubber coagulum is washed, milled or sheeted. The drying of the vulcanized crepe or sheet may be effected by any convenient process, such as is employed in the case of ordinary (unvulcanized) raw rubber crepe or sheet, or other form of raw rubber derived from the original coagulum.

Alternatively, the vulcanized rubber may, as already stated, be recovered from the liquid by evaporation, and it has been found possible to apply the vulcanized latex to numerous kinds of material, even of the flimsiest character. For instance, "butter muslin" may be easily sprayed with, or dipped in, the fluid and dried either at the ordinary temperature or with application of heat. Fabrics coated on both sides with a film of rubber can also readily be obtained.

Rubber sheets may be prepared from the coagulated product, or alternatively by building up a continuous film from the vulcanized fluid.

The following examples will serve to indicate the character of the invention in further detail, and it will be appreciated that these examples are given for illustrative purposes, and not by way of limitation.

*Examples of vulcanizing.*

Example I.—1.6 cc. of ammonia (0.88 s. g.) are added to 100 cc. of latex (containing about 30 per cent of rubber), and then a thin cream consisting of 3 grams of sulphur, one gram of zinc oxide and 1 cc. of piperidine in 35 cc. of water (the latter just made alkaline with 1-2 drops of ammonia) is stirred into the latex. The whole is placed in a vulcanizer and vulcanized, half-an-hour rise to 40 lbs. and half-an-hour at 40 lbs. After vulcanizing, the liquid is strained through cloth or in some other convenient manner. The rubber may be separated from the strained solution either by evaporation or by coagulation (followed by washing and drying by any desired method).

Example II.—As Example I, but using 1 gram of aldehyde-ammonia in lieu of the piperidine.

Example III.—As Example I, but using instead of piperidine 10 cc. of a solution of polysulphide of soda (containing about 25 per cent of precipitable sulphur).

Example IV.—To 100 cc. of latex (containing about 30 per cent of rubber) are added (a) 8 cc. of a solution of sodium polysulphide (containing about 25 per cent precipitable sulphur) and (b) 50 cc. of water made slightly alkaline with a few drops of ammonia. The mixture is heated in a vulcanizer for 30 minutes rise to 286° F. and 20 minutes at 286° F. After vulcanizing the liquid is strained, if requisite.

Coagulation of the vulcanized product may be effected by the addition of an acid such as acetic or sulphuric acid. For instance, to the liquid obtained according to Example IV above, 50-70 cc. of a 5 per cent solution of acetic acid are added, and the mixture is left to stand for some hours until substantially complete coagulation has been effected. The coagulum is then separated, washed and dried in the usual way. Alternatively, in lieu of the acetic acid, 30-50 cc. of a 5 per cent sulphuric acid solution may be added, and after completion of the coagulation, the coagulum separated and also treated in the desired way.

In the preparation of rubber compositions according to the present invention the danger of fire and the toxic effects associated with the usual rubber solvents are avoided, and these advantages attach not only to the process of manufacture of the composition but also to the application of the vulcanized latex. For example, in the impregnation or coating of fabrics, drying may be effected before an open fire, if desired. A further advantage is that the odor of the residue left on evaporation of the vulcanized latex is unobjectionable, whereas a certain peculiar odor is almost always left by the evaporation of solutions of rubber in the usual commercial solvents.

These vulcanized latex preparations are considerably less viscous, and consequently contain a larger amount of rubber for the same degree of viscosity, than the vulcanized or unvulcanized rubber solutions hitherto prepared.

What I claim as my invention and desire to secure by Letters Patent is:—

1. The process for the manufacture of a vulcanized caoutchouc-composition, which comprises submitting a substantially uncoagulated caoutchouc-containing material to vulcanization under such conditions as to preclude any substantial coagulation of the caoutchouc-component during the vulcanization.

2. The process for the manufacture of a vulcanized caoutchouc-composition, which comprises submitting a substantially uncoagulated caoutchouc-containing aqueous fluid to vulcanization under such conditions as to preclude any substantial coagulation of the caoutchouc-component during the vulcanization.

3. The process for the manufacture of a vulcanized caoutchouc-composition, which comprises submitting a substantially uncoagulated caoutchouc-containing aqueous fluid in an alkaline condition to vulcanization.

4. The process for the manufacture of a vulcanized caoutchouc-composition, which comprises submitting rubber latex to vulcanization under such conditions as to preclude any substantial coagulation of the rubber during the vulcanization.

5. The process for the manufacture of a vulcanized caoutchouc-composition, which comprises submitting diluted rubber latex to vulcanization under such conditions as to preclude any substantial coagulation of the rubber during the vulcanization.

6. The process for the manufacture of a vulcanized caoutchouc-composition, which comprises submitting rubber latex to vulcanization under such conditions as to preclude any substantial coagulation of the rubber during the vulcanization, and separating the rubber from the vulcanized aqueous product.

7. The process for the manufacture of a vulcanized caoutchouc-composition, which comprises submitting rubber latex to vulcanization under such conditions as to preclude any substantial coagulation of the rubber during the vulcanization, adding a rubber coagulant to the vulcanized aqueous product, and separating the coagulum.

8. The process for the manufacture of a vulcanized caoutchouc-composition, which comprises submitting rubber latex in an alkaline condition to vulcanization.

9. The process for the manufacture of a vulcanized caoutchouc-composition, which comprises submitting ammoniacal rubber latex to vulcanization.

10. The process for the manufacture of a vulcanized caoutchouc-composition, which comprises adding to rubber latex an alkaline vulcanizing agent, submitting the mixture to vulcanization, and separating the rubber from the vulcanized aqueous product.

11. The process for the manufacture of a vulcanized caoutchouc-composition, which comprises adding to rubber latex an alkaline vulcanizing agent, submitting the mixture to vulcanization, adding a rubber coagulant to the vulcanized aqueous product, and separating the coagulum of vulcanized rubber.

12. The process for the manufacture of a vulcanized caoutchouc-composition, which comprises adding to rubber latex an alkaline polysulphide, submitting the mixture to vulcanization, and separating the rubber from the vulcanized aqueous product.

13. The process for the manufacture of a vulcanized caoutchouc-composition, which comprises mixing rubber latex with a vulcanizing agent and a rubber compounding material, vulcanizing the mixture under such conditions as to preclude any substantial coagulation of the rubber during the vulcanization, and separating the compounded vulcanized rubber from the vulcanized aqueous product.

14. The process for the manufacture of a vulcanized caoutchouc-composition, which comprises mixing rubber latex with an alkaline vulcanizing agent and a rubber compounding material, vulcanizing the mixture, and separating the compounded vulcanized rubber from the vulcanized aqueous product.

15. As a novel composition of matter, a vulcanized substantially uncoagulated caoutchouc-containing material.

16. As a novel composition of matter, an aqueous vulcanized substantially uncoagulated caoutchouc-containing material.

17. As a novel composition of matter, vulcanized substantially uncoagulated rubber.

18. As a novel composition of matter, an aqueous preparation of vulcanized substantially uncoagulated rubber.

19. As a novel composition of matter, vulcanized substantially uncoagulated rubber latex.

20. As a novel composition of matter, vulcanized substantially uncoagulated alkaline rubber latex.

In testimony whereof I affix my signature.

PHILIP SCHIDROWITZ.